US012412711B2

(12) United States Patent
Chen

(10) Patent No.: US 12,412,711 B2
(45) Date of Patent: Sep. 9, 2025

(54) FRAME ASSEMBLY AND BUTTON

(71) Applicant: DARWIN PRECISIONS CORPORATION, Hsinchu County (TW)

(72) Inventor: Hsing-Yu Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 185 days.

(21) Appl. No.: 18/201,768

(22) Filed: May 25, 2023

(65) Prior Publication Data

US 2024/0186079 A1 Jun. 6, 2024

(30) Foreign Application Priority Data

Dec. 1, 2022 (TW) .................................. 111146168

(51) Int. Cl.
*H01H 13/7073* (2006.01)

(52) U.S. Cl.
CPC ............................... *H01H 13/7073* (2013.01)

(58) Field of Classification Search
CPC .... H01H 13/7073; H01H 13/14; H01H 13/52; H01H 13/04; H01H 13/023; H01H 3/12; H01H 13/705; H01H 13/7065
See application file for complete search history.

(56) References Cited

U.S. PATENT DOCUMENTS

| | | | | |
|---|---|---|---|---|
| 10,304,641 | B2 * | 5/2019 | Watanabe | H01H 13/14 |
| 10,930,448 | B2 * | 2/2021 | Ito | H01H 13/14 |
| 2024/0347289 | A1 * | 10/2024 | Chen | H01H 13/023 |

FOREIGN PATENT DOCUMENTS

| | | | |
|---|---|---|---|
| CN | 101419877 | A | 4/2009 |
| CN | 101447357 | A | 6/2009 |
| CN | 208368389 | U | 1/2019 |
| CN | 109509667 | B | 7/2020 |
| CN | 214670983 | U | 11/2021 |
| JP | H10255587 | A | 9/1998 |
| JP | 2001184978 | A | 7/2001 |
| JP | 2005353409 | A | 12/2005 |
| TW | M298179 | U | 9/2006 |
| TW | I402880 | B1 | 7/2013 |

* cited by examiner

*Primary Examiner* — Lheiren Mae A Caroc

(57) ABSTRACT

A frame assembly is adapted to be mounted on a substrate having a contact switch. The frame assembly includes a frame body and at least one spring arm. The frame body is adapted to move along an operational direction to be in contact with the contact switch. The spring arms are connected to the frame body and obliquely extend from the frame body to the substrate, so that when the frame body is not pressed by an external force, there is a spacing between the frame body and the contact switch. In this way, the number of parts of a button may be reduced by connecting the spring arms to the frame body. The present invention further provides a button using the above frame assembly.

9 Claims, 4 Drawing Sheets

FRAME ASSEMBLY AND BUTTON

FIELD OF THE INVENTION

The present invention relates to a frame assembly and a button, and more particularly to a frame assembly applied to a button capable of emitting light, and a button using the frame assembly.

BACKGROUND OF THE INVENTION

A button is a very common input device at present, which allows a user to input a signal by press to control large machinery such as an elevator. To allow the user to conveniently identify the position or type of the button, at present, light-emitting elements will be mounted inside some buttons, for example, on substrates at the bottoms of the buttons, and light-transmitting windows are arranged on the buttons to facilitate the user's observation.

The known button includes a frame and an electrical signal generation component (such as a pressure sensor and a pressure switch). In order not to trigger the electrical signal generation component when the user does not press the frame, and to make the frame generate a rebound function after the press is over, or to give the user a press forced feedback during the press and other reasons, a reset component such as a spring which can separate the frame from the electrical signal generation component when the frame is pressed and may rebound after the press is over must be arranged in the button. To prevent the displacement or loss of the reset component during assembly or maintenance, additional components must be designed to fix it, thus complicating the structure of the button and increasing the troubles of production and maintenance.

SUMMARY OF THE INVENTION

The present invention provides a frame assembly, to reduce the number of components required to constitute a button.

In addition, the present invention provides a button, to reduce the number of components.

To achieve the above advantages, an embodiment of the present invention provides a frame assembly adapted to be mounted on a substrate having a contact switch. The frame assembly includes a frame body and at least one spring arm. The frame body is adapted to move along an operational direction to be in contact with the contact switch. The at least one spring arm is connected to the frame body. The at least one spring arm obliquely extends from the frame body to the substrate, so that when the frame body is not pressed by an external force, there is a spacing between the frame body and the contact switch.

In an embodiment of the present invention, the above frame body has a ring wall forming an opening, and the at least one spring arm is connected to a ring side wall surface of the ring wall.

In an embodiment of the present invention, the above frame body has a ring wall forming an opening, and the at least one spring arm is located inside or outside the opening.

In an embodiment of the present invention, each of the above at least one spring arm includes a first extension section and a second extension section, the first extension section is connected between the second extension section and the frame body, and the first extension section and the second extension section have different extension directions.

In an embodiment of the present invention, the above frame assembly further includes an outer frame being adapted to be mounted on the substrate and surrounding the frame body, the outer frame has a slide groove, an extension direction of the slide groove is parallel to the operational direction, and the frame body is provided with a bump slidably arranged in the slide groove.

The above button provided by the present invention includes a substrate and a frame assembly. The substrate has a contact switch. The frame assembly is connected to the substrate. The frame assembly includes a frame body and at least one spring arm. The frame body is adapted to move along an operational direction to be in contact with the contact switch. The spring arms are connected to the frame body and obliquely extend from the frame body to the substrate, so that when the frame body is not pressed by an external force, there is a spacing between the frame body and the contact switch.

In an embodiment of the present invention, the above frame body has a ring wall forming an opening, and the at least one spring arm is connected to a ring side wall surface of the ring wall.

In an embodiment of the present invention, the above frame body has a ring wall forming an opening, and the at least one spring arm is located inside or outside the opening.

In an embodiment of the present invention, each of the above spring arms includes a first extension section and a second extension section, the first extension section is connected between the second extension section and the frame body, and the first extension section and the second extension section have different extension directions.

In an embodiment of the present invention, the above button further includes an outer frame being adapted to be mounted on the substrate and surrounding the frame body, the outer frame has a slide groove, an extension direction of the slide groove is parallel to the operational direction, and the frame body is provided with a bump slidably arranged in the slide groove.

In an embodiment of the present invention, the above substrate further includes at least one light-emitting element, and a position of the at least one spring arm projected on the substrate along the operational direction avoids a position of the at least one light-emitting element.

Based on the above description, in the frame assembly and the button using the same according to the present invention, the frame body is supported by the spring arms connected to the frame body, so that when the frame body does not bear an external force, there is a spacing between the frame body and the contact switch on the substrate. When the frame body bears an external force and moves towards the contact switch along the operational direction, the contact switch can be triggered by deforming the spring arms, and after the frame body does not bear an external force, the above spacing is generated again with an action of returning the spring arms to the original shape, thus reducing the number of components required for the button.

To make the above and other objectives, features and advantages of the present invention more obvious and understandable, the following is a detailed description of the embodiments in combination with the accompanying drawings.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Hereinafter, the terms used in the description of the embodiments according to the present invention, such as the description of orientational or positional relationships indicated by "upper", "lower", and the like, are described according to the orientational or positional relationships shown in the figures used. The above terms are merely for the convenience of describing rather than limiting the present invention, that is to say, they do not indicate or imply that the element mentioned must have a specific orientation or be constructed in a specific orientation. In addition, the terms "first", "second", and the like mentioned in this specification or the scope of the patent application are only used to name the elements or distinguish different embodiments or scopes, rather than to limit the upper or lower limit of the number of elements.

Figure 1:
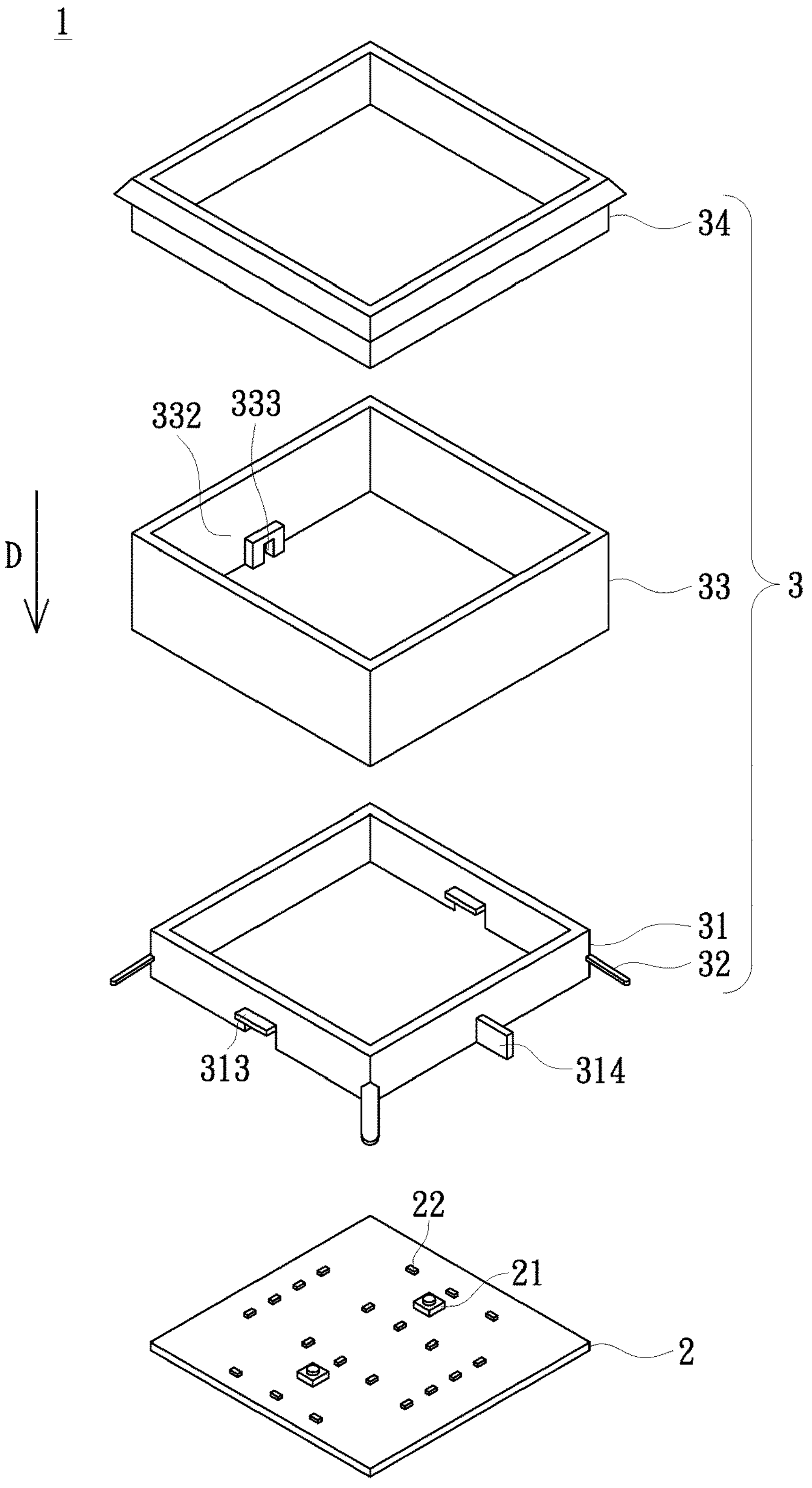
FIG. 1 is a schematic diagram of an exploded view of a button according to an embodiment of the present invention.
Figure 2A:
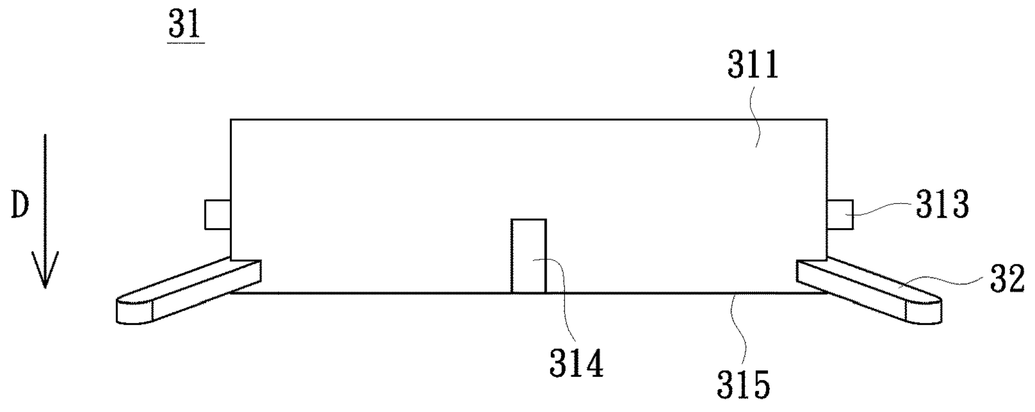
FIG. 2A is a schematic diagram of a side view of a frame body in FIG. 1.
Figure 2B:
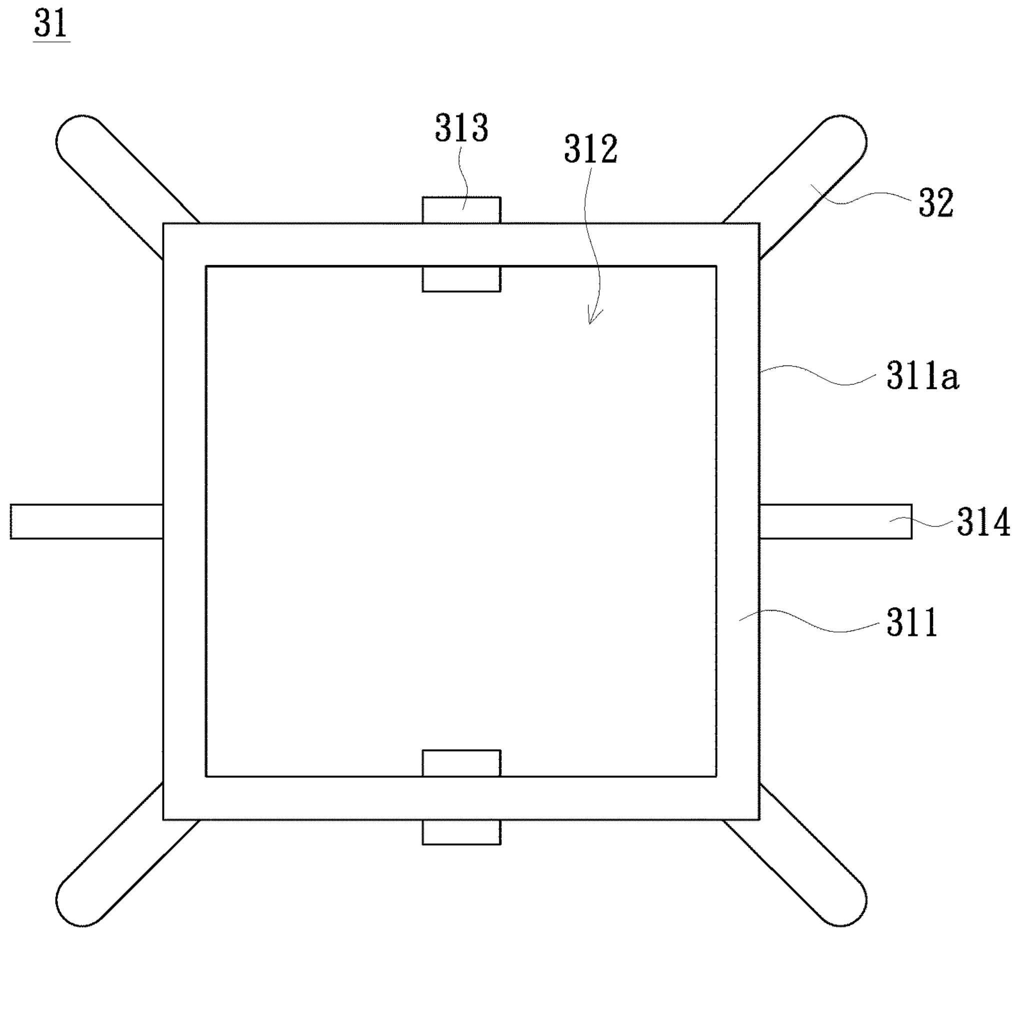
FIG. 2B is a schematic diagram of a top view of the frame body in FIG. 1.
Figure 3:
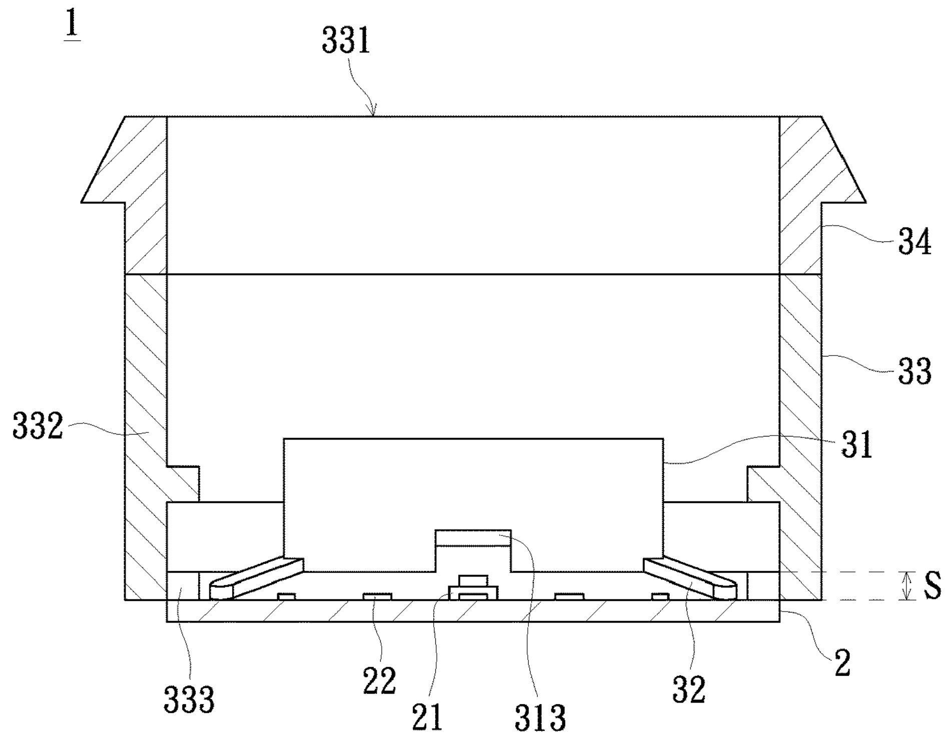
FIG. 3 is a schematic diagram of a partial sectional view of the button in FIG. 1.
Figure 4:
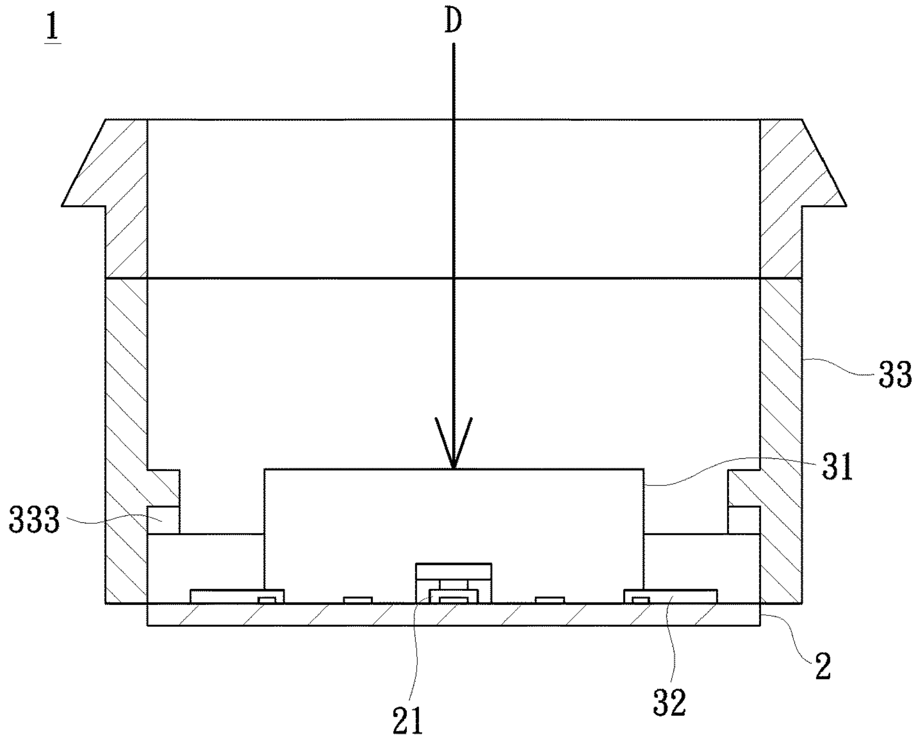
FIG. 4 is a schematic diagram of a partial sectional view of the button in FIG. 1 during actuation.

FIG. 1 is a schematic exploded view of a button according to an embodiment of the present invention. FIG. 2A is a schematic side view of a frame body in FIG. 1. FIG. 2B is a schematic top view of the frame body in FIG. 1. FIG. 3 is a schematic partial sectional view of the button in the embodiment of FIG. 1. FIG. 4 is a schematic partial sectional view of the button in the embodiment of FIG. 1 during actuation. Referring to FIG. 1 to FIG. 4, a button 1 in this embodiment includes a substrate 2 and a frame assembly 3. The substrate 2 has a contact switch 21. The frame assembly 3 is connected to the substrate 2 and includes a frame body 31 and spring arms 32. The frame body 31 is adapted to move along an operational direction D to be in contact with the contact switch 21. The spring arms 32 are connected to the frame body 31 and obliquely extend from the frame body 31 to the substrate 2, so that when the frame body 31 is not pressed by an external force, there is a spacing S between the frame body 31 and the contact switch 21.

When the frame body 31 bears the external force and is extruded towards the contact switch 21 along the operational direction D, the spring arms 32 will deform during the process, meanwhile, the frame body 31 moves towards the substrate 2 to reduce the spacing S between the frame body 31 and the contact switch 21, and finally the contact switch 21 is pressed (as shown in FIG. 4). When the external force disappears, the spring arms 32 return to the original shape; and by pushing against the substrate 2, there is the spacing S between the frame body 31 and the contact switch 21 again (as shown in FIG. 3).

As shown in FIG. 1, in this embodiment, for example, a plurality of light-emitting elements 22 are distributed on the substrate 2. The light-emitting elements 22 are, for example, light-emitting diodes (LEDs), but are not limited to this. The contact switch 21 is, for example, a push switch mounted on the substrate 2. The number of contact switches may be, for example, two, but is not limited to this. In this embodiment, the button 1, for example, is a button of an elevator. A user presses the frame body 31 indirectly through a transparent frame (not shown in figure) along the operational direction D to make the frame body 31 contact with the contact switch 21, so that a circuit where the contact switch 21 is located may be connected to generate an electrical signal to control the operation of the elevator.

As shown in FIG. 1, the frame assembly 3, for example, further includes an outer frame 33 and a front cover 34. The front cover 34 is mounted on the outer frame 33, and the outer frame 33 is mounted on the substrate 2 and surrounds the frame body 31 and the spring arms 32. The outer frame 33 cooperates with the front cover 34 to form a first opening 331 which is open along the operational direction D. The first opening 331 has an inner wall surface 332, and for example, a slide groove 333 is provided on the inner wall surface 332 of the outer frame 33. An extension direction of the slide groove 333 is parallel to the operational direction D.

The frame body 31 has, for example, a ring wall 311. The ring wall 311 defines a second opening 312 which is opened along the operational direction D. Press portions 313 adapted to press two contact switches 21 along the operational direction D are arranged at positions of the ring wall 311 that correspond to the two contact switches 21. Referring to FIG. 2A and FIG. 2B, the shape of the frame body 31 is not specially restricted, may be a square shown in FIG. 2B, a triangle, or a circle, and may be determined, for example, by the shape of the button 1 or the positions of the light-emitting elements 22 on the substrate 2.

In addition, referring to FIG. 1 to FIG. 2B, a bump 314 corresponding to the slide groove 333 arranged on the above outer frame 33 in position is provided on a side wall surface 311*a* of one side of the frame body 31 that is away from the second opening 312, for example. When the frame body 31 is combined with the outer frame 33, the bump 314 enters the slide groove 333, so that the frame body 31 is restricted by the outer frame 33 and can only slide along the operational direction D.

As shown in FIG. 1 to FIG. 4, for example, the spring arms 32 are connected to the side wall surface 311*a* of the ring wall 311 that is outside the second opening 312; for example, as shown in FIG. 2A and FIG. 2B, the spring arms are connected to the side wall surface 311*a* and close to the bottom of the side wall surface 311*a*; and for example, the spring arms extend to the substrate 2 from four corners of the frame body 31, but are not limited to this. In other words, in other embodiments, the spring arms 32 may extend to the substrate 2 at the top of the side wall surface 311*a*, or may extend to the substrate at a position between the top and bottom of the side wall surface 311*a*, or may obliquely extend to the substrate 2 with a bottom surface 315 (see FIG. 2A) of the frame body 31 that faces the substrate 2 as a joint between the spring arms 32 and the frame body 31. Through the above structure, when the frame body 31 and the substrate 2 are combined, the spacing S can be formed between the frame body 31 and the contact switch 21, as shown in FIG. 3.

Figure 5:
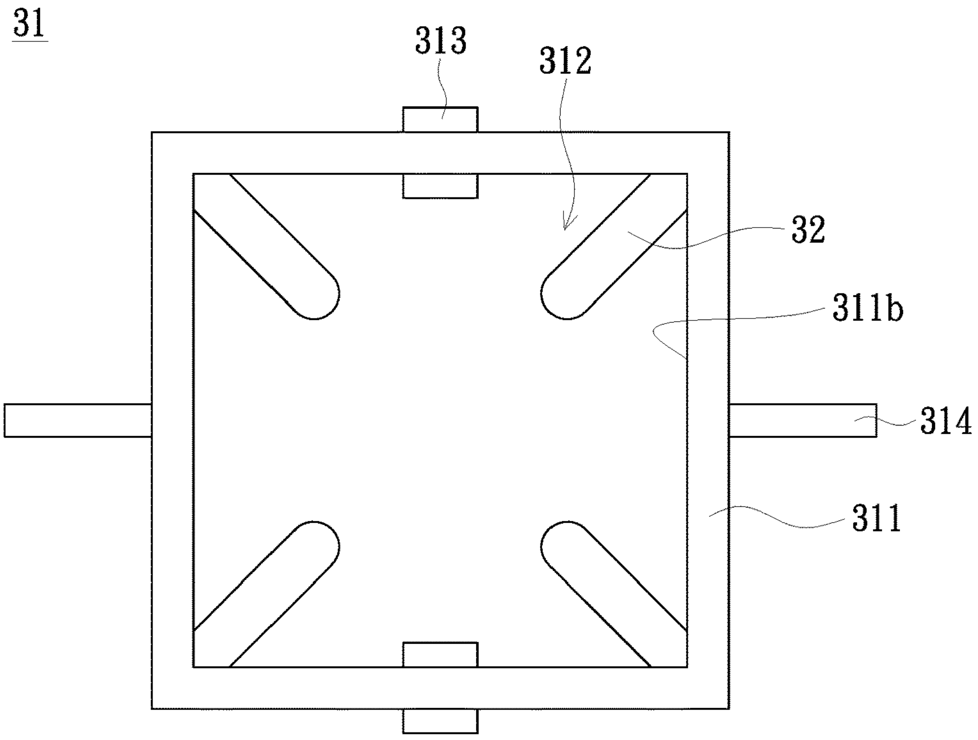
FIG. 5 is a schematic diagram of a frame according to another embodiment of the present invention.

In addition, the positions of the spring arms 32 may be determined, for example, by the distribution of the light-emitting elements 22 on the substrate 2, that is to say, the position of the spring arms 32 projected on the substrate 2 along the operational direction D will avoid the position of the at least one light-emitting element 22. Therefore, in the embodiment shown in FIG. 1 where the plurality of light-emitting elements 22 on the substrate 2 may be seen in the second opening 312, the spring arms 32 are located outside the second opening 312, and the plurality of light-emitting elements 22 may be seen between the outer frame 33 and the frame body 31, but in the embodiment where there are fewer light-emitting elements 22 in the second opening 312 of the frame body 31, for example, as shown in FIG. 5, the spring arms 32 may be arranged on a side wall surface 311*b* in the second opening 312. Similarly, there is no restriction that the spring arms 32 must be arranged at the corners of the frame body 31 as in FIG. 1 to FIG. 5, and the spring arms may be arranged on the edges of the frame body 31. The number of spring arms 32 is not specially limited.

Because the spring arms 32 deform when the frame body 31 bears the external force acting along the operational direction D, and return to the original shape when the frame body 31 does not bear the external force, the spring arms 32 may be, for example, made of an elastic material. In the embodiment where the frame body 31 is made of an elastic material, both the spring arms 32 and the frame body 31 may be integrally formed.

Figure 6:
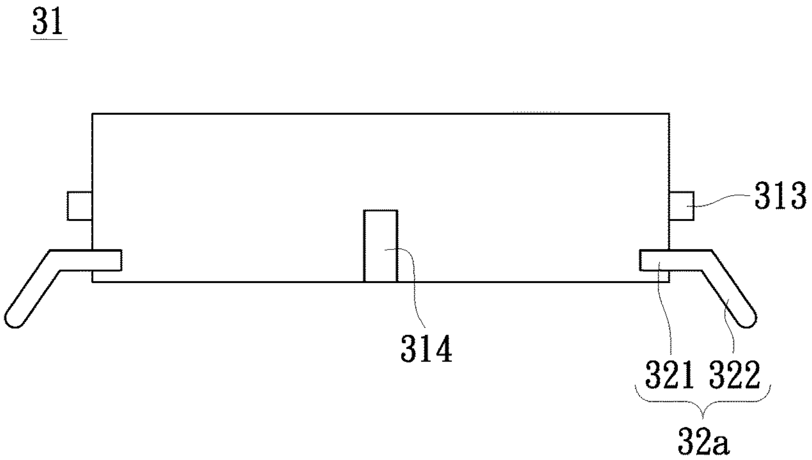
FIG. 6 is a schematic diagram of a frame according to another embodiment of the present invention.

FIG. 6 is a schematic diagram of a frame according to another embodiment of the present invention. Referring to FIG. 6, in the embodiment shown in FIG. 6, spring arms 32*a* are different from the spring arms 32 in FIG. 1, FIG. 2A, and FIG. 3. Specifically, the spring arms 32 in FIG. 1, FIG. 2A, and FIG. 3 obliquely extend to the substrate 2 linearly from the side wall surface 311*a* of the frame body 31 directly. Each of the spring arms 32*a* in FIG. 6, for example, includes a first extension section 321 and a second extension section 322. The first extension section 321 is connected between the second extension section 322 and the frame body 31, and extends out along a direction parallel to the substrate 2, for example. The second extension section 322 obliquely extends to the substrate 2, for example. In other words, the first extension section 321 and the second extension section 322 may extend in different directions, but a contact point of the spring arm 32*a* composed of the first extension section 321 and the second extension section 322, that is connected to the frame body 31, and a contact point of the spring arm 32*a* that is in contact with the substrate 2 are still inclined to the operational direction D.

Based on the above description, in the frame assembly and the button using the same according to the present invention, the frame body is supported by the spring arms connected to the frame body, so that when the frame body does not bear an external force, there is the spacing between the frame body and the contact switch on the substrate. When the frame body bears an external force and moves towards the contact switch along the operational direction, the contact switch can be triggered by deforming the spring arms, and after the frame body does not bear the external force, the above spacing is generated again with an action of returning the spring arms to the original shape. The number of components required for the button is reduced by combining the frame body for pressing the contact switch with the spring arms for driving the frame body to rebound, and the spring arms are capable of flexibly making changes corresponding to the positions of the light-emitting elements on the substrate.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A frame assembly adapted to be mounted on a substrate having a contact switch, wherein the frame assembly comprises:

a frame body adapted to move along an operational direction to be in contact with the contact switch; and at least one spring arm connected to the frame body, wherein the at least one spring arm obliquely extends from the frame body to the substrate, so that when the frame body is not pressed by an external force, there is a spacing between the frame body and the contact switch;

wherein the frame body has a ring wall forming an opening, and the at least one spring arm is connected to a ring side wall surface of the ring wall.

2. The frame assembly according to claim 1, wherein the at least one spring arm is located inside or outside the opening.

3. The frame assembly according to claim 1, wherein each of the at least one spring arm comprises a first extension section and a second extension section, the first extension section is connected between the second extension section and the frame body, and the first extension section and the second extension section have different extension directions.

4. The frame assembly according to claim 1, further comprising an outer frame being adapted to be mounted on the substrate and surrounding the frame body, wherein the outer frame has a slide groove, an extension direction of the slide groove is parallel to the operational direction, and the frame body is provided with a bump slidably arranged in the slide groove.

5. A button, comprising:

a substrate having a contact switch;

a frame assembly connected to the substrate, wherein the frame assembly comprises:

a frame body adapted to move along an operational direction to be in contact with the contact switch; and at least one spring arm connected to the frame body, wherein the at least one spring arm obliquely extends from the frame body to the substrate, so that when the frame body is not pressed by an external force, there is a spacing between the frame body and the contact switch;

wherein the frame body has a ring wall forming an opening, and the at least one spring arm is connected to a ring side wall surface of the ring wall.

6. The button according to claim 5, wherein the at least one spring arm is located inside or outside the opening.

7. The button according to claim 5, wherein each of the at least one spring arm comprises a first extension section and a second extension section, the first extension section is connected between the second extension section and the frame body, and the first extension section and the second extension section have different extension directions.

8. The button according to claim 5, further comprising an outer frame being adapted to be mounted on the substrate and surrounding the frame body, wherein the outer frame has a slide groove, an extension direction of the slide groove is parallel to the operational direction, and the frame body is provided with a bump slidably arranged in the slide groove.

9. The button according to claim 5, wherein the substrate further comprises at least one light-emitting element, and a position of the at least one spring arm projected on the substrate along the operational direction avoids a position of the at least one light-emitting element.

* * * * *